United States Patent [19]

Jahme et al.

[11] Patent Number: 4,507,167

[45] Date of Patent: Mar. 26, 1985

[54] PLATE CHANGING APPARATUS FOR OFFSET PRINTING MACHINES

[76] Inventors: Hans-Joachim Jahme, Eckernfordestr. 1, 6200 Wiesbaden; Harry Bracke, Trompeterstr. 40, 6200 Wiesbaden-Dambach, both of Fed. Rep. of Germany

[21] Appl. No.: 545,247

[22] Filed: Oct. 25, 1983

[30] Foreign Application Priority Data

Oct. 26, 1982 [DE] Fed. Rep. of Germany ....... 3239580

[51] Int. Cl.[3] ........................... C23F 1/02; B44C 1/22; C03C 15/00; C03C 25/06

[52] U.S. Cl. ..................................... 156/345; 156/905

[58] Field of Search ............ 156/639, 654, 656, 659.1, 156/905, 345, 285, 382; 271/99, 103, 104, 106; 101/142; 414/129

[56] References Cited

U.S. PATENT DOCUMENTS

| | | | |
|---|---|---|---|
| 2,803,078 | 8/1957 | Coughlin | 156/345 |
| 3,930,925 | 6/1976 | Yamanaka | 156/345 |
| 4,208,233 | 6/1980 | Iwanaga | 156/345 |

*Primary Examiner*—William A. Powell

*Attorney, Agent, or Firm*—Cushman, Darby & Cushman

[57] ABSTRACT

Plate changing apparatus for use with offset printing machines, including a plate stacking table, plate individualizing means for sequentially withdrawing only the lowermost plate from the stacking table, and plate transporting and guiding means to guide the freshly withdrawn plate to a form cylinder of the printing machine after having passed through a fixing bath. The apparatus includes means to pass the separated plate through a fixing bath prior to its deposit on the form cylinder and a depository for used plates removed from the form cylinder. The novelty resides in the individualizing means including a rotatable vacuum roll disposed adjacent a partly open bottom surface of the plate stacking table or container or tray holding the plates so that it can engage the lowermost plate. The vacuum roll has its shaft mounted in parallel with the leading edge of the plate stack for linear displacement in parallel with the bottom stack surface. A fixing bath container is disposed directly below the plate stack and the individualizing means and adjacent the form cylinder. This arrangement results in a particularly compact construction while enabling the plates to be handled carefully.

8 Claims, 2 Drawing Figures

PLATE CHANGING APPARATUS FOR OFFSET PRINTING MACHINES

FIELD OF THE INVENTION

The invention relates to printing plate changing apparatus for offset printing machines.

BACKGROUND OF THE PRESENT INVENTION

Plate changers of this type include as individualizing means a friction roll engaging the uppermost plate in a stack of plates, with the plates being individualized by the friction roll being rotated at appropriate times to push the top plate from the stack into guide means comprising rolls and guide rails or vanes to guide the offset plate through an etchant or fixing bath container removably mounted in the offset printing machine and from the container directly onto the form cylinder. After having been fixed, the plate is retained on the form cylinder by known means such as suitable grippers so that printing may start right after the fixing treatment. As soon as the printing plate is to be changed, the grippers are suitably controlled to open and the plate is conveyed from the form cylinder to a used-plate depository.

In plate changing apparatus of this type, the stacking table for the supply of plates, the fixing bath container and the form cylinder are sequentially arranged substantially in a row so that the system has a relatively great overall length. In the case of small-size offset printers, these space requirements may constitute a substantial disadvantage, and individualization, or removal of individual plates frequently is unsatisfactory. Furthermore, as the individualizing means engages each plate on the side bearing the graphic information, visible traces may be left on the finished printed product.

It is, therefore, an object of the present invention to improve printing plate changing apparatus of the kind described above so that the plate changing mechanism will be much more compact and save space, to have as low a number of parts as possible, and to realize improved reliability with respect to plate individualization. Further, the present invention allows for a more careful handling of the printing surface of such plates.

SUMMARY OF THE PRESENT INVENTION

In accordance with the invention, these objects are achieved by a novel plate removal system that removes new plates from the bottom of a stack of such plates in a simple yet precise manner that protects the printing surface and allows for easy handling.

Owing to the use of separate individualizing means, namely a vacuum roll to withdraw plates from the bottom of a stack of plates, the plate stacking table may be disposed at a low height right above the etchant or fixing bath tank so that the plate changing mechanism in its entirety requires the least volume of space possible. At the same time, the proposed arrangement allows careful handling of the printing plate surface because the vacuum roll engages the non-printing plate surface. Also, this way of arranging the components of the plate changing mechanism allows for the unobstructed placement of fresh plates on the top of the stack without disturbing the plate changing process that may be in progress—a feature of particular benefit if plate preparation is automatic.

In accordance with a preferred form of the invention, the reciprocating and at the same time rotational movement of the vacuum roll for separating the leading portion of the lowermost plate from the stack is generated by linear guide means incorporated in a crank-type drive arrangement, with the vacuum roll shaft having at one end thereof a gear meshing with a rack fixedly mounted on the machine frame. This solution results in a particularly simple manner of generating the simultaneous reciprocating and rotating movements of the vacuum roll. Likewise, suction is created within the vacuum roll simultaneously with this reciprocating process.

By selecting the pitch circle diameter of the vacuum roll shaft gear to correspond to the diameter of the vacuum roll and by selecting the linear displacement of the vacuum roll to correspond to at least one half of its developed circumference, the lowermost plate of the stack will initially be stressed in flexure only, but not in tension. This is because after having attracted the lowermost plate by suction the vacuum roll will roll along the bottom surface of the plate only to the extent to which the plate is wrapped around the rotating vacuum roll.

The vacuum roll is divided into a plurality of axially spaced apart vacuum roll sections so that rollers or ball bearings, freely movable relative to the vacuum roll sections can be provided therebetween with those rollers having substantially the same or a slightly greater diameter than the vacuum roll. A transport roll is positioned below the vacuum roll so that it extends paraxially relative to that vacuum roll and the rolls or ball bearings thereon. The separated lowermost plate may be introduced between that transport roll and the rollers on the vacuum roll shaft. Thereafter, a positive driving action can be applied to the transport roll to cause the plate to be stressed in tension, i.e. after the individualizing process proper has long been over.

In a particularly simple manner, the negative pressure required for the vacuum roll may be generated by utilizing the reciprocating movement of the vacuum roll to reciprocate a piston in a stationary pump cylinder and to thus make use of the piston's suction stroke to generate the negative pressure.

The negative pressure in the pump cylinder and thus in the vacuum roll is removed at the appropriate time by the piston exposing one or several ports extending through the cylinder walls near its lower dead center position at the end of the suction stroke to admit atmospheric pressure to the cylinder.

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENT OF THE PRESENT INVENTION

Figure 1:
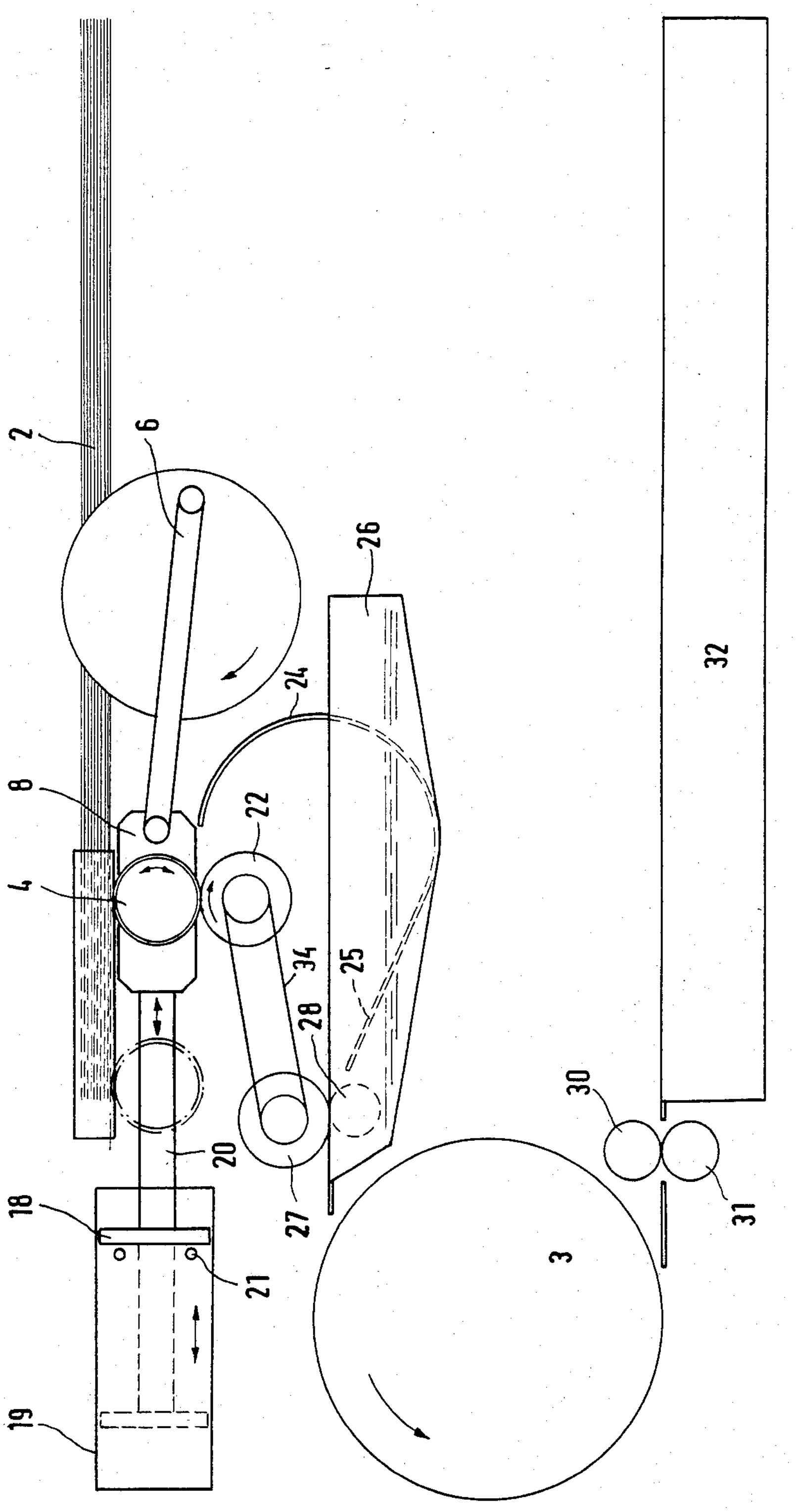
FIG. 1 shows schematically an elevation view of the plate changing apparatus and of the form cylinder of an offset printing machine, depicting the principles of the inventive arrangement of the component parts.

As shown in FIG. 1, the inventive plate changing apparatus is disposed above and transversely offset from the form cylinder 3 of a conventional offset printing machine. The construction of machines of this type is adequately known to those skilled in the art and need not be discussed in detail in this specification.

The position of the plate stacking table is shown schematically by the plate stack 2. That table has an appropriately dimensioned opening in its bottom in the region of the leading edge of the stack where vacuum roll 4 will be moved so that vacuum roll 4 will be able to directly engage the plates of stack 2 through that opening when reciprocated to a position under that opening and at the same time rotated by crank drive 6. The most forward position of the vacuum roll is shown in phantom whereas the rearmost position, shown in solid lines, is reached with the crank drive in its corresponding position short of rear dead center. Vacuum roll 4 or its shaft is journalled in linear guide 8 of crank drive 6, with the outer end of the vacuum roll shaft being coupled to a gear 10, shown in FIG. 2, of which the pitch circle diameter corresponds to the vacuum roll diameter. Also, gear 10 meshes with a rack 12 mounted on machine frame 14. The manner of mounting vacuum roll 4 and of dimensioning gear 10 results in vacuum roll 4 positively rolling along the bottom surface of the stack of plates during its reciprocation.

Figure 2:
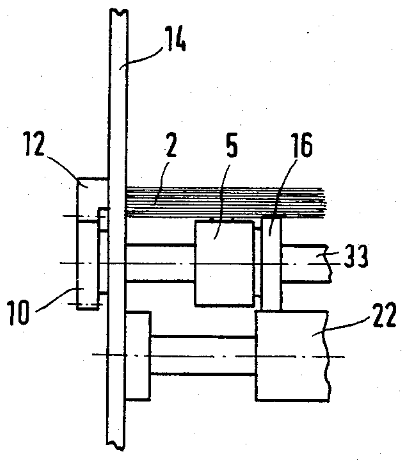
FIG. 2 is a partial view from the right-hand side of FIG. 1 to illustrate further principles of the invention.

Along its length, the vacuum roll 4 is divided into individual vacuum roll sections 5, one of which is shown in FIG. 2. Each cylindrical vacuum roll section 5 has a suction cup (not shown) on the periphery thereof which in the foremost dead center position of the vacuum roll (shown in phantom in FIG. 1) points vertically upwardly to engage the bottommost plate. In the rearmost position shown in solid lines in FIG. 1, that suction cup is rotated to a downwardly pointing vertical position. This occurs short of the rear dead center position of vacuum roll 4; that is, in its rear dead center position, the vacuum roll has rotated by slightly more than 180° to safely introduce the plate into the transport roll nip between rolls 16 and vacuum roll 4 on the one hand and to prevent the suction cups from rubbing along the plate on the other.

In addition, rolls or ball bearings 16 are mounted on the shaft of vacuum roll 4 and adjacent each vacuum roll section 5 so as to be freely rotatable on the shaft, such rolls or bearings 16 having a diameter substantially corresponding to or slightly greater than the diameter of the vacuum roll sections 5. The purpose of these rolls or ball bearings 16 will be discussed in detail below.

The negative pressure required for the vacuum roll 4 in its individualizing operation is generated in a particularly advantageous manner by making use of the existing reciprocating movement of linear guide 8. To this end, the interior of vacuum roll 4 is suitably coupled through a hollow shaft 33 supported by the linear guide 8 to a hollow piston rod 20 which is connected to and through piston 18 so that piston 18 will be moved back and forth in a pump cylinder 19 axially aligned with the linear guide and so that the pressure conditions existing within cylinder 19 will be directly connected to the interior of vacuum roll 4.

Near the forward dead center position of linear guide 8, corresponding to the upper dead center position of piston 18 in cylinder 8 or preferrably shortly thereafter, the suction cups on vacuum roll sections 5 engage the lowermost plate, i.e. shortly after the pump piston has begun its suction stroke. As the lowermost plate will seal the suction cups, the suction stroke of pump piston 18 causes the required negative pressure to be generated to retain the lowermost plate on the suction cups of vacuum roll sections 5 so that the plate will be wrapped around vacuum roll 4 while the latter rolls along the bottom surface of the plate permitted by the opening provided in the bottom of the plate cassette; this way the bottom most plate will progressively be separated downwardly away from the stack of printing plates. Short of or at the end of the suction stroke, pump piston 18 will expose one or more ports 21 extending through the cylinder walls thereby causing the negative pressure in pump cylinder 19 and thus in vacuum roll 4 to collapse or be released as these components communicate in a pressure-tight relationship through linear guide 8 and hollow piston rod 20. This collapse of pressure in the rear dead center position enables the plate wrapped around vacuum roll 4 to be released by and separate from the suction cups.

A transport roll 22 is disposed paraxially with and vertically below vacuum roll 4 in the rear dead center position thereof so that the ball bearings or freely rotatable rolls 16 provided on the shaft 33 of vacuum roll 4 define with transport roll 22 a nip for the plate separated from the bottom of the stack. Owing to the rotation and simultaneous linear displacement of vacuum roll 4, the leading edge of the lowermost plate in the stack will be introduced into that transport roll nip. As mentioned above, the negative pressure in the vacuum roll will be released as the vacuum roll reaches its rear dead center position (lower dead center of the piston); in this condition, the suction cups on vacuum roll sections 5 will not support the separated plate any longer so that transport roll 22, if driven in a clockwise direction (in FIG. 1) by suitable drive means, and the cooperating rolls or ball bearings 16 on the shaft of vacuum roll 4 will cause the lowermost plate to be withdrawn completely from underneath stack 2, with vacuum roll 4 and linear guide 8 remaining at a standstill at that time.

Thereafter, the separated plate fed through between rolls 16 and transport roll 22 will be guided downwardly into fixing bath container 26 holding a suitable fixing fluid, with guidance being effected by guide rail means 24 which extends substantially downwardly with a semi-circular shape. Similar guide means may be provided on both sides of the transport path to define correspondingly shaped slots. The aforesaid semi-circular guide means 24 has at its bottom end a linear extension 25 to guide the plate from the fixing bath towards a pair of transport rolls 27, 28 provided at the end of fixing bath container 26 adjacent form cylinder 3. Transport roller 27 is coupled through an endless belt 34 or the like to transport roll 22, with both transport rolls being driven in synchronism with the printing machine through means such as an electromagnetically actuatable clutch adapted to be operated from the main machine control unit should it be desired to place a new plate onto form cylinder 3.

Transport rolls 27, 28 push the plate arriving from the fixing bath container towards the form cylinder 3 under conventional grippers (not shown) or the like provided to retain the plate on the form cylinder so that form cylinder rotation will cause the plate to be automatically wrapped therearound and properly tensioned on the form cylinder. The subsequent printing process of the offset printing machine with the printing plate in its fully operative position on the form cylinder need not be described to any detail; it is adequately known and unnecessary for understanding the subject invention.

However, after the printing process employing the plate has been terminated, the form cylinder plate grippers will be released and the plate will be separated automatically from the form cylinder 3 and discharged into a used-plate depository 32 such as by a pair of transport rolls 30, 31.

Thereafter, the main printer control unit will again activate the individualizing means, causing the leading portion of the next lowermost plate to be peeled from the stack in the manner described above. Thus, another plate will be fed between rolls 16 and transport roll 22 and be withdrawn completely from the stacking table, passed through the fixing bath and pushed into engagement with conventional grippers on form cylinder 3, which rotates at a speed, relative to rolls 27 and 28, appropriate to again wrap and tension that next plate around and on the form cylinder.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. Printing plate changing apparatus for offset printing machines which include a form cylinder and an etchant or fixing bath, including a printing plate stacking table, plate individualizing means for withdrawing plates from the stacking table, and plate transporting and guiding means to transport and guide a fresh plate to be applied to the form cylinder from the individualizing means after having passed through the etchant or fixing bath to the form cylinder and to guide the used plate from the form cylinder to a depository, wherein in that the individualizing means comprises a rotatable vacuum roll disposed adjacent the partly open bottom surface of plate stacking table to engage the bottom surface of the stack, said vacuum roll having a shaft extending in parallel with the front edge of the plate stack and being adapted to be displaced linearly in parallel with the bottom of the stack, said fixing bath container being disposed directly underneath the stack of printing plates and said individualizing means.

2. Printing plate changing apparatus as in claim 1, wherein the shaft of vacuum roll is supported in a linear guide of a crank-type drive and having a gear fixed on one end, a rack fixedly mounted on machine frame and meshing with a gear coupled to the shaft of said vacuum roll with rotary movement being effected to said vacuum roll by relative movement between said gear and said rack.

3. Printing plate changing apparatus as in claim 2, wherein the diameter of the vacuum roll corresponds to the pitch circle diameter of said gear and wherein the linear displacement of vacuum roll corresponds to at least one half of its developed circumference.

4. Printing plate changing apparatus as in claim 1, wherein said vacuum roll is divided axially into a plurality of vacuum roll sections, with adjacent ones of the said sections having rollers mounted therebetween for free rotation relative to said sections, said rollers having substantially identical diameters to said sections, said apparatus further including a transport roll positioned adjacent and parallel to said vacuum roll so that a transport roll nip is formed between said seconds and said transport roll for the lowermost plate partly separated from the bottom of the stack.

5. Printing plate changing apparatus as in claim 4, further including guide rail means semicircular in section and extending away from said transport roll nip to guide the removed printing plate into and through the fixing bath, and a pair of transport rolls disposed at the outlet of the fixing bath adjacent the form cylinder.

6. Printing plate changing apparatus as in claim 1, further including means for connecting the interior of said vacuum roll to negative pressure generating means for establishing a predetermined negative pressure in said vacuum roll.

7. Printing plate changing apparatus as in claim 6 wherein said negative pressure generating means comprises a hollow piston rod in a pressure-tight relationship with the interior of a stationary pump cylinder, said pump cylinder having a pump piston mounted for displacement therein and operatively coupled to said hollow piston rod to generate negative pressure for vacuum roll.

8. Printing plate changing apparatus as in claim 7, further including means defining a port positioned in said pump cylinder to admit atmospheric air into said pump cylinder near the lower dead center position of said pump piston corresponding to the rearmost dead center position of said linear guide.

* * * * *